United States Patent [19]
Ohno

[11] Patent Number: 5,334,124
[45] Date of Patent: Aug. 2, 1994

[54] GUIDE ROLLS

[75] Inventor: Hideyuki Ohno, Yokohama, Japan

[73] Assignee: Nippon Oil Co., Ltd., Tokyo, Japan

[21] Appl. No.: 116,052

[22] Filed: Sep. 2, 1993

Related U.S. Application Data

[63] Continuation-in-part of Ser. No. 804,304, Dec. 9, 1991, abandoned.

[30] Foreign Application Priority Data

Feb. 27, 1991 [JP] Japan .................. 3-53547

[51] Int. Cl.$^5$ .................. B21B 31/08; B60B 5/00
[52] U.S. Cl. .................. 492/50; 492/52; 492/53; 492/59
[58] Field of Search .................. 492/49, 50, 51, 52, 492/56, 59, 53; 428/421, 451, 461

[56] References Cited

U.S. PATENT DOCUMENTS

| | | | |
|---|---|---|---|
| 2,033,894 | 3/1936 | Crockford | 492/50 |
| 2,158,006 | 5/1936 | Ellis, III | 492/50 |
| 2,614,058 | 10/1952 | Francis | 492/50 |
| 3,639,958 | 2/1972 | Griffiths | 492/50 |
| 3,698,053 | 10/1972 | Hess et al. | 492/50 |
| 4,199,626 | 4/1980 | Stryjewski et al. | 492/53 |
| 4,430,406 | 2/1984 | Newkirk et al. | 492/56 X |
| 4,804,576 | 2/1989 | Kuge et al. | 492/56 X |
| 4,810,564 | 3/1989 | Takahashi | 492/56 X |
| 4,887,340 | 12/1989 | Kato et al. | 492/56 X |
| 4,950,538 | 8/1990 | Honda et al. | 492/59 X |
| 5,014,406 | 5/1991 | Kato et al. | 492/56 X |
| 5,061,533 | 10/1991 | Gomi et al. | 492/56 X |
| 5,099,560 | 3/1992 | Kato et al. | 492/56 X |

Primary Examiner—Timothy V. Eley
Attorney, Agent, or Firm—Bucknam and Archer

[57] ABSTRACT

A guide roll comprising an inside layer made of a fiber-reinforced material which consists essentially of an epoxy resin composition as a matrix and at least one kind of reinforcing fibers selected from the group consisting of carbon fibers, glass fibers, alumina fibers, aramide fibers, polyester fibers and polyethylene fibers, and an outside layer which consists essentially of a fluororesin.

5 Claims, 1 Drawing Sheet

GUIDE ROLLS

This application is a CIP of U.S. application Ser. No. 07/804,304 filed Dec. 9, 1991, which is now abandoned.

BACKGROUND OF THE INVENTION

1. Field of the Invention

This invention relates to a guide roll which is suitable for use as a guide roll for a printing press, or the like.

Prior Art

A metal roll made of iron or aluminum has heretofore widely been used as a guide roll for a printing press, an offset printing roll, a guide roll for an apparatus for producing a magnetic film and a stretched film and a roll of a rotary press and a sheet-making machine. However, since a metal roll is heavy in weight and high in inertia, it does not immediately stop its rotation when emergency stop of the apparatus is needed, thereby raising problems as to scratches caused by friction between the metal roll and the product obtained and as to mounting and replacing of such a roll being troublesome.

To solve such problems, a composite roll using therein a composite material such as resin-fixed carbon fibers has come to be used. The composite roll is a reinforced composite one obtained by hardening with a resin carbon fibers having high strength and high elastic modulus, and the like, as the main components. Such rolls (blank pipes) made of reinforced composite material are disadvantageous in that not only printed matter is blurred with an ink but also the ink adhering to the printed matter cannot be wiped off so easily due to excessively high wettability of the rolls with the ink when they are used for printing or the like. Therefore, improved composite rolls have been proposed which are provided with a surface layer of a metal (e.g. chromium or nickel) on the surface of the blank pipe to improve them in anti-wettability.

Since the composite roll is light in weight and has low inertia, it is possible for the roll to be made more accurate in controlling the number of revolutions so as render it possible to decrease scratches caused by the friction between the roll and the product at the time of emergency stop. Since the composite roll is light in weight, it can easily be mounted or replaced. Furthermore, it can be reduced in diameter and thickness, and production efficiency can be improved by increasing the number of revolutions. The composite roll exhibits less dead load deflection and can be used even in portions which require high accuracy.

The composite roll provided with the surface layer as described above has somewhat satisfactory wettability with an ink. However, when the composite roll is used as a guide roll for a printing press, the ink of printed matter will adheres to the roll and blurs the subsequent printed matter. Therefore, the means for removing ink adhering to the roll during printing is indispensable, and the cost of the printing press needed is higher as a whole. A wipe-off operation of the ink adhering to the roll must be carried out whereby the printing operation becomes troublesome.

SUMMARY OF THE INVENTION

The present invention is made in view of these problems raised in the prior art, and aims at providing a guide roll which is highly unwettable with a fluid such as an ink and which simplifies the operations and can suppress the increase in cost of production.

A guide roll according to the present invention is characterized by including an inside layer made of a fiber-reinforced material which consists essentially of an epoxy resin composition as a matrix and at least one kind of reinforcing fibers selected from the group consisting of carbon fibers, glass fibers, alumina fibers, aramide fibers, polyester fibers and polyethylene fibers, and an outside layer which consists essentially of a fluororesin.

Function

Since the inside layer is made of a fiber-reinforced material, it is light in weight and has low inertia and can be produced with smaller diameter and less thickness. The critical number of revolutions is large and dead load deflection is low. The outside layer consisting essentially of a fluororesin is excellent in abrasion resistance and slidability with respect to paper or a film, and is very unwettable with a fluid such as an ink.

DESCRIPTION OF THE PREFERRED EMBODIMENT

Hereinafter, an embodiment of the present invention will be explained with reference to the accompanying drawings.

Figure 1:
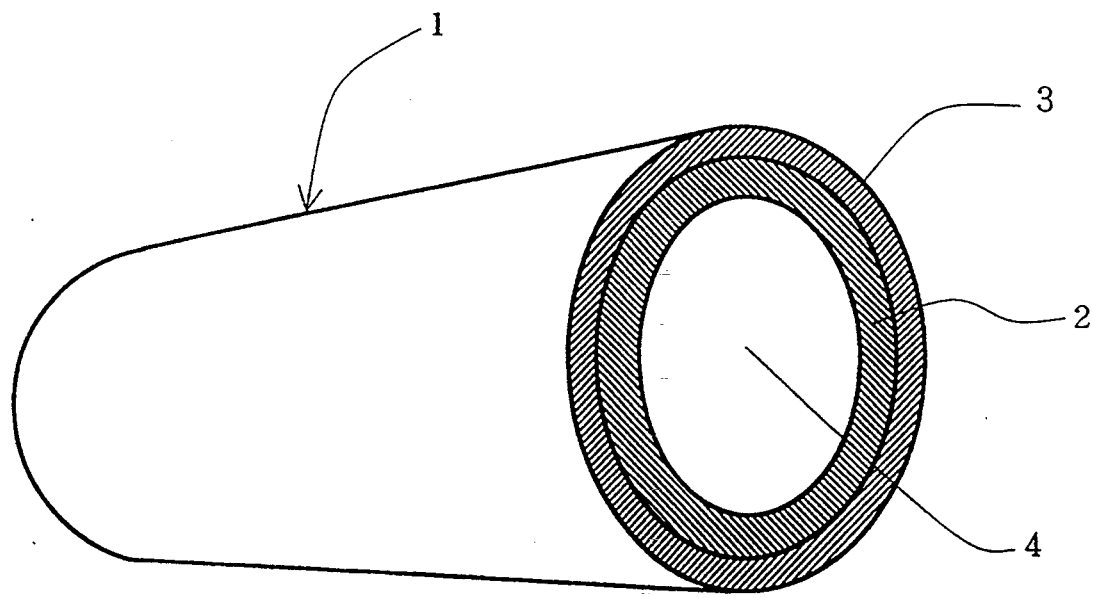
FIG. 1 is a sectional view of a guide roll according to one embodiment of the present invention.

FIG. 1 shows the section of a guide roll 1 according to one embodiment of this invention. In FIG. 1, reference numeral 1 represents a guide roll equipped with an inside layer 2 and an outside layer 3. The inside layer 2 is a layer made of a fiber-reinforced material obtained by hardening reinforcing fibers as the main component with an epoxy resin composition as the matrix. The inside portion 4 of the inside layer 2 is hollow. The outside layer 3 consists essentially of a fluororesin, and its thickness is arbitrary and is, for example, from about 40 to about 500 $\mu$m.

The reinforcing fibers used for the inside layer according to the present invention are selected from the group consisting of carbon fibers, glass fibers, alumina fibers, aramide fibers, polyester fibers, polyethylene fibers and mixtures thereof. More preferred are carbon fibers.

The resin for fixing the reinforcing fibers is an epoxy resin composition. The epoxy resin composition is preferably a heat-resistant epoxy resin composition having a heat deformation-starting temperature of not less than 170° C., more preferably not less than 180° C., and a glass transition temperature (Tg) of not less than 180° C., more preferably not less than 200° C.

In a case where such an epoxy resin composition having heat resistance is used, the fluororesin used for the outside layer can be cured in a relatively high temperature in the heating step for curing said fluororesin. In the heating step for curing the fluororesin, it is important for the enhancement of physical properties, such as hardness, of the fluororesin and bonding strength between the outside layer and the inside layer that the heat treatment for curing the fluororesin be carried out in a temperature which is as high as possible within the curable temperature range of fluororesin. Therefore, the use of the above epoxy resin composition having heat resistance for the inside layer enables more enhancement of physical properties of the guide roll.

The heat-resistant epoxy resin compositions according to the present invention are preferably exemplified by those containing, as a curing agent, at least one member selected from the group consisting of diaminodiphenyl sulfone (DDS, such as 3,3'-DDS or 4,4'-DDS), diphenylguanidine and polyether sulfone.

In a case where the above curing agent is incorporated in the epoxy resin composition, the amount of the curing agent is not particularly limited and may suitably be selected depending on the kinds of the epoxy resin used and the curing agent used, and the like. The amount of the curing agent is preferably in the range of 10–50 parts by weight, more preferably 20–40 parts by weight, on the basis of 100 parts by weight of the epoxy resin.

The epoxy resin according to the present invention may be usual epoxy resins which include bisphenol A type epoxy resins, bisphenol F type epoxy resins, phenolic novolak type epoxy resins, cresol novolak type epoxy resins, brominated epoxy resins, cycloaliphatic epoxy resins, and epoxy resins having tetraglycidyl aminodiphenylmethane skeleton, triglycidyl -m- aminophenol skeleton, triglycidyl -p-aminophenol skeleton or pentaerythritol skeleton. These epoxy resins may be used singly or jointly. The epoxy resin composition according to the present invention may suitably contain, as required, phenolic resins as far as the heat resistance of the composition is impaired.

The fluororesin used for the outside layer according to the present invention is preferably at least one member selected from the group consisting of tetrafluoroethylene resins, chlorotrifluoroethylene resins, polyvinylidene fluoride resins, polyvinyl fluoride resins, tetrafluoroethylene-perfluorovinyl ether copolymer resins, tetrafluoroethylene hexafluoropropylene copolymer resins and tetrafluoroethylene-ethylene copolymer resins.

Methods for forming the outside layer consisting essentially of the fluororesin on the outside surface of the inside layer are not particularly limited and can suitably be selected in various methods. For example, the following methods are preferably employed: (i) a method comprising the steps of forming a film of a fluororesin paint on the outside surface of the inside layer by spray coating or electrostatic powder coating, and then heat treating the fluororesin film, and (ii) a method comprising the steps of covering the outside surface of the inside layer with a film or a tube of a fluororesin, and then heat treating the film or the tube to make it contract.

The temperature for the heat treatment of fluororesin may suitably be selected depending on the desired properties, the kind of the fluororesin used, the heat resistance of the inside layer, and the like, and is preferably in the range of 150°–270° C., more preferably in the range of 170°–220° C. It is generally impossible to carry out the heat treatment of fluororesin in a temperature which is higher than the heat resistance of the inside layer. Therefore, it is important for raising the temperature for the above heat treatment in order to enhance hardness of the fluororesin cured that the inside layer have higher heat resistance.

The resultant outside layer made of the fluororesin such cured according to the present invention preferably has a Rockwell hardness of not less than 50, more preferably not less than 70.

The outside layer according to the present invention consists essentially of a fluororesin. The state of the outside surface of the outside layer may suitably be selected depending on the use of the resultant guide roll, and may be employed without further surface treatment. Further, since the outside surface of the outside layer according to the present invention has a sufficient hardness, the above outside surface may also be polished until the desired surface-state or the desired thickness of the outside layer is obtained. The outside surface of the guide roll of the present invention may have been finished to a mirror-like surface, while the above state may have been treated to a rough surface.

A suitable intermediate layer may be disposed between the inside layer 2 and the outside layer 3.

Since the inside layer 2 is made of the fiber-reinforced material, this guide roll 1 is light in weight and has low inertia. Therefore, it can be more accurate in controlling the number of revolutions and can quickly stop at the time of emergency stop. Mounting and replacement of the roll is easily carried out owing to its light weight. Furthermore, such a roll can be made with smaller diameter and less thickness whereby production efficiency can be improved by increasing the number of revolutions. The roll 1 is low in dead load deflection, and it can be used for portions for which high accuracy is required. Particularly, it can suitably be used for an apparatus for producing photograph films, such as X-ray films, and thin magnetic films which require accuracy. The outside surface of the outside layer may be polished where a particularly high level of accuracy is required.

Since the outside layer 3 of this guide roll 1 consists essentially of a fluororesin, it is very unwettable with a fluid such as an ink and with a liquid and is difficult to blur. Therefore, inks and the like cannot easily adhere to the roll and even if they adhere, they can easily be wiped off. Therefore, the guide roll 1 is a preferable roll for a printing press. When the guide roll 1 is used as a guide roll for a printing press, means for removing inks adhering to the roll becomes unnecessary.

The guide roll has excellent sliding characteristics (slidability) and, therefore, it does not damage a substrate (printed matter and various films) guided by the roll. It is excellent in scratch resistance, wear resistance, weatherability and chemical resistance and has a long service life. If heat-resistant materials are used in the production of the inside layer 2 and the outside layer 3, the roll 1 will be able to withstand its use at a high temperature.

Figure 2:
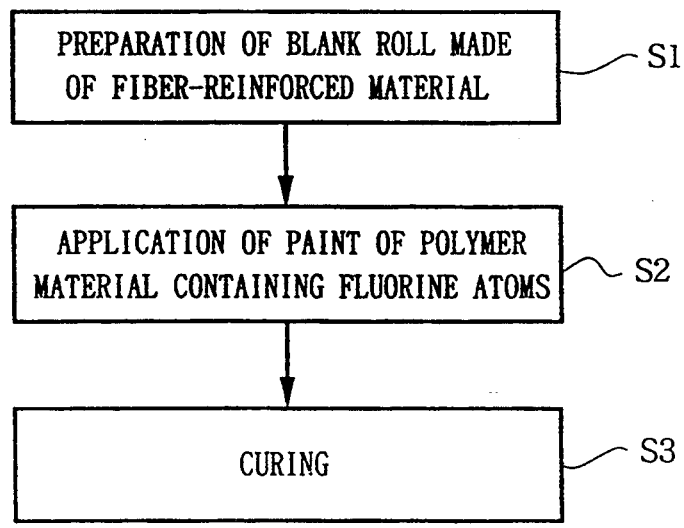
FIG. 2 is a flowchart showing the steps of producing the guide roll shown in FIG. 1.

Next, an embodiment of a method for the production of the guide roll 1 as shown in FIG. 1 will be explained step-wise with reference to FIG. 2. (Step S1)

First of all, a blank roll is produced, for example, from a fiber-reinforced material. An ordinary method of producing a blank roll from fiber-reinforced material can be used as this production method.

Methods for forming into blank rolls may include an ordinary sheet rolling method, a method which winds a tape-like prepreg, and a filament winding method. When the prepreg is used, a cloth (woven fabric) prepreg, in addition to a unidirectional prepreg, may be used and the directions of the fibers can also be selected suitably. However, if the fibers are aligned in the longitudinal direction of the roll, high strength can be obtained. Therefore, the fibers are preferably aligned in such a longitudinal direction by the use of the sheet rolling method. If layers extending along the longitudinal direction of the roll (so-called "0° direction") and layers extending along a direction substantially orthogonal to the former (so-called "90° direction") are laminated together, the resulting roll has high strength against the force in the longitudinal direction as well as against the force in the roll rupturing direction.

After a roll is shaped or formed, it is cured by heat treatment to obtain a blank roll (blank pipe). In this embodiment, a prepreg obtained by allowing carbon fibers, which are unidirectionally arranged, to be impregnated with an epoxy resin is wound by the sheet rolling method and is heated and cured. (Step S2)

Next, a paint of a fluororesin is applied to the blank roll described above. A paint of the type which is cured when heated to around 180° C. is used herein. This paint is applied to the blank roll by an air spray while rotating the blank roll, and is dried under rotation at room temperature for 10 minutes. (Step S3)

Next, the dried blank roll is heated to about 180° C. while being slowly rotated inside a curing furnace so as to cure the coated paint layer which is to be an outside layer. In this way, the outside layer consisting essentially of the fluororesin is formed.

In the manner described above, a guide roll 1 as shown in FIG. 1 is produced. No deformation at all is observed in the guide roll 1 thus produced. Even when an ink is applied to the roll 1, it does not at all adhere to the roll 1.

It is also possible to execute appropriately the step of forming an intermediate layer after the inside layer is formed in the step S1 and to form an outside layer consisting essentially of the fluororesin outside the intermediate layer.

The method of applying a paint of the fluororesin is not limited to the method described above, and any ordinary coating methods such as a method using hand coating, a method using a roll impregnated with a solution, a method for dipping a blank roll while rotating it, etc, can also be employed.

Though the embodiment described above uses a fluororesin paint of the type which is cured when heated to about 180° C., paints which are cured at various temperatures can be used so long as they are paints of the fluororesin. The heating step S3 described above is not necessary when there is employed a paint of the type which is cured when it is only allowed to stand at room temperature to be cured.

If necessary, a step of polishing and finishing the surface of the outside layer consisting essentially of the fluororesin may be added. When a roll requiring a particularly high level of accuracy is produced, polish-finishing is preferred. However, since the paint of the fluororesin is a fluid and has a levelling property (levelling effect), it can be applied accurately, smoothly and uniformly over the surface of the blank roll by being merely applied, so long as the blank roll made of the fiber-reinforced material is accurately finished. In this case, surface polish-finishing of the outside layer is not necessary, and, nevertheless, a high accuracy roll can be produced simply.

EXAMPLE

The most preferred embodiment of the present invention will be explained hereinafter, but the present invention is not limited to the embodiment in the Example.

Unidirectional prepregs of carbon fibers were obtained by the use of 100 parts by weight of bisphenol A type epoxy resin, 40 parts by weight of diaminodiphenyl sulfone (DDS) and 330 parts by weight of carbon fibers having a tensile modulus of 490 GPa and a tensile strength of 3600 MPa.

By the use of the prepregs obtained, a CFRP (carbon fiber-reinforced plastics) hollow roll (cylinder) having an inner diameter of 92 mm, an outer diameter of 100 mm and a length of 1000 mm was produced by the sheet rolling method. In the hollow roll, 16 layers extending along the longitudinal direction of the roll (so-called "0° direction") and 16 layers extending along a direction substantially orthogonal to the former (so-called "90° direction") have been alternately laminated together. The resin in the CFRP hollow roll had a heat deformation-starting temperature of 190° C. and a glass transition temperature (Tg) of 205° C.

Next, tetrafluoroethylene hexafluoropropylene copolymer was applied to the outside surface of the CFRP hollow roll by the electrostatic powder coating method, and then subjected to the heat treatment at a temperature of 180° C. for 3 hours.

The resultant fluororesin layer (outside layer) had a thickness of 0.3 mm and a Rockwell hardness of 70.

The hollow roll thus obtained for a guide roll had a weight of 2 kg, a flexural modulus of 180 GPa and a flexural strength of 550 MPa. Therefore, it was recognized that the above hollow roll has an enough high strength, an enough light weight and an enough low deflection, and was very suitable for use as a guide roll.

EFFECT OF THE INVENTION

As described above, the present invention provides a guide roll which has a very highly unwettable property against a fluid such as an ink and can reduce labors for operations and limit an increase in cost of production.

Further, the guide roll of the present invention is light in weight and has low inertia. Therefore, when the above guide roll was used, a skid thereof can be prevented at the time of start or stop of rotation. Additionally, since the guide roll is very low in deflection, it does not cause any furrow on a film-like material guided by the guide roll.

Furthermore, the outside surface of the guide roll of the present invention is substantially formed by a fluororesin and has a high hardness and, therefore, the above surface can be polished to a mirror-like surface or treated to a rough surface, as required. In a case where a specific heat-resistant epoxy resin composition is used as the matrix for the inside layer, the fluororesin used for the outside layer can be subjected to a heat treatment at a relatively high temperature so as to obtain a guide roll having a very hard surface.

What is claimed is:

1. A guide roll comprising an inside layer made of a fiber-reinforced material which consists essentially of an epoxy resin composition as a matrix and at least one kind of reinforcing fibers selected from the group consisting of carbon fibers, glass fibers, alumina fibers, aramide fibers, polyester fibers and polyethylene fibers, and an outside layer which consists essentially of a fluororesin.

2. A guide roll according to claim 1, wherein the fluororesin is at least one member selected from the group consisting of tetrafluoroethylene resins, chlorotrifluoroethylene resins, polyvinylidene fluoride resins, polyvinyl fluoride resins, tetrafluoroethylene-perfluorovinyl ether copolymer resins, tetrafluoroethylene hexafluoropropylene copolymer resins and tetrafluoroethylene-ethylene copolymer resins.

3. A guide roll according to claim 1, wherein the fluororesin has a Rockwell hardness of not less than 50.

4. A guide roll according to claim 1, wherein the epoxy resin composition is a heat-resistant epoxy resin composition having a heat deformation-starting temperature of not less than 170° C. and a glass transition temperature of not less than 180° C.

5. A guide roll according to claim 1, wherein the epoxy resin composition is a heat-resistant epoxy resin composition containing at least one member selected from the group consisting of diaminodiphenyl sulfone, diphenylguanidine and polyether sulfone.

* * * * *